3,641,095
BONDED LOW-ALUMINA MORDENITE
Joseph R. Kiovsky, Kent, Ohio, and Ronald K. Bart, Sterling Junction, Mass., assignors to Norton Company, Worcester, Mass.
No Drawing. Filed Oct. 29, 1969, Ser. No. 872,408
Int. Cl. B01j 11/40
U.S. Cl. 252—455 Z       1 Claim

ABSTRACT OF THE DISCLOSURE

Natural or synthetic mordenite from which alumina has been removed to give silica to alumina ratio of 20/1 and higher is bonded into agglomerates for catalytic purposes by employing attapulgite type clays to which colloidal silica, in water dispersion stabilized with ammonium ions, is added.

BACKGROUND OF THE INVENTION

This invention relates to bonded agglomerates of high-silica mordenite.

Mordenite is one of the molecular sieve zeolites which has been found useful in various gas separation, ion exchange, and catalytic applications. Mordenite occurs naturally and has been synthesized; such mordenite is a metallo-alumino-silicate having a silica to alumina ratio of from 9:1 to 11:1. A particular property of mordenite is its ability to have substantial portions of the alumina removed by chemical treatment while still retaining its crystalline form. Thus acid leaching as disclosed in Sand Pat. 3,436,174, can be employed to produce leached mordenites having a silica to alumina ratio as high as 50/1. Calcination of hydrogen exchanged mordenite, followed by acid leaching, as disclosed in U.S. application Ser. No. 754,646, now abandoned, can achieve silica to alumina mole ratios of 100 to 1 and higher, with the zeolite crystal structure of the mordenite being retained.

Such highly siliceous mordenites are useful as catalysts in hydrocarbon conversion reactions. For most such applications it is desirable to utilize the material in the form of bonded pellets. One way of producing such pellets has been the use of clay-type bonding agents, the attapulgite type clays, which may contain minor proportions of bentonite, being particularly useful in connection with the bonding of mordenites having a silica to alumina ratio of between 9 to 11 and 11 to 1.

When such bonds have been employed with mordenites having a silica to alumina mole ratio of higher than 20 to 1, although the catalytic activity of such bodies has been satisfactory, the strength of such pellets, particularly in regard to attrition resistance, has been unsatisfactory.

U.S. Pats. 3,158,579 and 3,287,281 teach the use of attapulgite type clays in bonding zeolites.

SUMMARY OF THE INVENTION

The present invention resides in the discovery that the addition of from ½ to 20% of colloidal silica, in the form of an ammonium ion stabilized aqueous dispersion, results in bonded pellets of suitable activity, strength, and attrition resistance.

DESCRIPTION OF SPECIFIC EMBODIMENTS

Commercially available synthetic mordenite powder in the hydrogen exchanged form was leached in 1 N HCl to a silica to alumina ratio of 44 to 1, and employed in the following examples.

Three mixtures were made to demonstrate this invention.

Mixture A: 80% by weight of the acid leached mordenite and 20% of bonding clay.

Mixture B: Silica, in the form of Ludox AS, ammonium stabilized colloidal silica (available from E. I. du Pont de Nemours and Company, Inc., Wilmington, Del.) was added to Mixture A in the amount of 3%, by weight, calculated as $SiO_2$.

Mixture C: In this mixture some of the bonding clay was replaced by an equal weight of $SiO_2$. The mixture was:

|  | Percent |
|---|---|
| Mordenite | 80 |
| Bonding clay | 14 |
| $SiO_2$ (as Ludox AS) | 6 |

These mixtures were intimately mixed and enough water added to allow easy extrusion. The extruded pellets were dried and fired at 550° C. for 1½ hours.

The strength of ⅛ inch pellets was determined by a standard test (Flat Plate Crushing Strength):

| Mixture: | Strength (FPCS-pounds) |
|---|---|
| A | 12.9 |
| B | 15.4 |
| C | 20.5 |

Attrition loss of the pellets was determined by measuring the weight loss incurred when a sample of the pellets is fluidized in a stream of dry air for one hour. Mixture A has a loss of 3.4%, Mixture B a loss of 1.5%, and Mixture C, a loss of 0.3%, by weight.

Since sodium atoms can be a potent catalyst poison, the sodium content of the pellets was determined. In mixes B and C the sodium content was well below 0.1%, calculated as $Na_2O$.

The pellets of the present invention may be impregnated with a noble metal such as palladium and employed as a hydrocracking catalyst.

The use of from ½ to 20% by weight of colloidal silica in the bond results in the improved pellets of this invention.

The firing temperature may vary between 400 and 700° C.

What is claimed is:

1. A method of bonding mordenite powder having a silica to alumina mole ratio above 20 to 1, comprising mixing said mordenite with a clay bonding agent including from ½ to 20% of silica, said silica being added as an aqueous, ammonium stabilized, colloidal dispersion, and firing said pellets to mature the bond.

References Cited

UNITED STATES PATENTS

| 3,436,174 | 4/1969 | Sand | 23—113 |
| 3,234,147 | 2/1966 | Drost et al. | 252—455 Z |
| 3,065,054 | 11/1962 | Haden, Jr. et al. | 252—455 X |

CARL F. DEES, Primary Examiner